US008891748B2

(12) United States Patent
Rand et al.

(10) Patent No.: US 8,891,748 B2
(45) Date of Patent: Nov. 18, 2014

(54) SYSTEM AND METHOD FOR ESTABLISHING A CALL

(75) Inventors: Tom Rand, Toronto (CA); Anthony Knight, Toronto (CA); Jim Brown, Toronto (CA); John Blair, Toronto (CA); Chris Smith, Toronto (CA); Evan Wright, Toronto (CA)

(73) Assignee: First Media Group Inc., Toronto (CA)

( * ) Notice: Subject to any disclaimer, the term of this patent is extended or adjusted under 35 U.S.C. 154(b) by 1278 days.

(21) Appl. No.: 11/138,554

(22) Filed: May 27, 2005

(65) Prior Publication Data

US 2005/0286498 A1    Dec. 29, 2005

(51) Int. Cl.
*H04M 3/42*    (2006.01)
*H04M 7/12*    (2006.01)

(52) U.S. Cl.
CPC ........ *H04M 7/1205* (2013.01); *H04M 3/42382* (2013.01); *H04M 2203/652* (2013.01)
USPC .................................. 379/201.11; 379/88.13

(58) Field of Classification Search
USPC ......... 370/260, 352, 259; 379/201.11, 202.01
See application file for complete search history.

(56) References Cited

U.S. PATENT DOCUMENTS

| 6,148,067 A * | 11/2000 | Leipow .................... 379/201.01 |
| 6,175,619 B1 * | 1/2001 | DeSimone ............... 379/202.01 |
| 6,389,132 B1 * | 5/2002 | Price ........................ 379/265.01 |
| 7,039,040 B1 * | 5/2006 | Burg ............................. 370/352 |
| 2002/0122391 A1 * | 9/2002 | Shalit ............................ 370/260 |
| 2002/0136390 A1 * | 9/2002 | Lang et al. ..................... 379/222 |
| 2003/0039339 A1 * | 2/2003 | Luehrig et al. ............. 379/88.13 |
| 2003/0084103 A1 * | 5/2003 | Weiner et al. ................ 709/205 |
| 2003/0112945 A1 * | 6/2003 | Brown et al. ............. 379/201.01 |
| 2004/0013254 A1 * | 1/2004 | Hamberg et al. ........ 379/202.01 |
| 2005/0078612 A1 * | 4/2005 | Lang ............................. 370/260 |
| 2005/0085250 A1 * | 4/2005 | Lee et al. ...................... 455/509 |
| 2006/0171380 A1 * | 8/2006 | Chia ............................. 370/352 |
| 2008/0139228 A1 * | 6/2008 | Raffel et al. .................. 455/466 |

* cited by examiner

Primary Examiner — Simon Sing

(57) ABSTRACT

A system and method for providing a voice communication service between a first user and a second user after the first user and the second user are communicating via a non-voice communication service is described. The non-voice communication service may be processed through a server in communication with the first and second users. The non-voice communication service is monitored for a voice service request, and upon receipt of the voice service request, establishment of a voice communication service is initiated between the first and second users through the server. The first and second users may be anonymous to each other over the non-voice communication service and the voice communication service.

19 Claims, 7 Drawing Sheets

SYSTEM AND METHOD FOR ESTABLISHING A CALL

FIELD OF INVENTION

The present invention relates to a system and method establishing a call, such as a telephone call.

BACKGROUND OF THE INVENTION

For person-to-person communications, a myriad of technologies are available to provide live, voice communications and real-time non-voice communications between at least two people. Voice communications may be conducted through parties having appropriate telephones (or similar devices) connected on a public switched telephone network (PSTN), a private switched telephone network (PBX), a cellular telephone network or through a combination of the networks. Non-voice communications can be conducted by persons accessing appropriate terminals (or similar devices) using data networks and data channels, such as email, short message service (SMS) and others. It is also common to have devices which incorporate both voice and non-voice capabilities (e.g. cell phones with SMS messaging capabilities).

As with most person-to-person communications there is a "calling" party and a "called" party. For a typical telephone call, the called party can obtain information about the calling party, through frequency shift key (FSK) signals embedded in between rings which precede establishment of a call, unless the signals are otherwise blocked. When sending email, the sender needs to know the address of the recipient of the email. Generally, the recipient will be provided the sender's address.

While existing person-to-person communication technologies individually have advantages, there is a need for additional technologies which can bridge between two or more different protocols. There is a need for a system and method establishing person-to-person communications which incorporates various advantages of existing systems through different channels.

SUMMARY OF THE INVENTION

In one aspect of the present invention, a method for providing a voice communication service between a first user and a second user after the first user and the second user are communicating via a non-voice communication service is provided. The non-voice communication service may be processed through a server in communication with the first and second users. The method comprises the steps of monitoring for a voice service request, and upon receipt of the voice service request, selectively initiating establishment of the voice communication service between the first and second users through the server.

The step of selectively initiating establishment of the voice communication service may further comprise identifying the first and second users by the server using data transmitted by the first and second users over the non-voice communication service, and identifying contact information for the first and second users for the voice service request utilizing the data.

The step of initiating establishment of the voice communication service may further comprise initiating a first connection by the server to the first user using the contact information associated with the first user, initiating a second connection by the server to the second user using the contact information associated with the second user, and bridging the first and second connections to complete the initiating establishment of the voice communication service.

The step of selectively initiating establishment of the voice communication service may comprise contacting at least one of the first and second users over the non-voice communication service for a confirmation of acceptance of the voice service request, monitoring for the confirmation, and upon receipt of the confirmation, initiating establishment of the voice communication service. The confirmation from the at least one of the first and second users may include alternate contact information, and the alternate contact information may be used by the server in initiating establishment of the voice communication service instead of the contact information.

In a further refinement of the aspect of the invention, the non-voice communication service may provide transmission of a SMS message, and the voice service request may be embedded in the SMS message. Further, the first and second connections may be initiated by the server in a voice-enabled network. Still further, the voice enabled network may be selected from the group consisting of ISDN, PSTN, PBX, ATM, packet-based circuits and cellular network.

The step of selectively initiating establishment of the voice communication service may further comprise checking for access rights of at least one of the first and second users, and checking for compatibility between the first and second users.

In another aspect of the present invention, the step of selectively initiating establishment of the voice communication service comprises contacting the first user over the non-voice communication service to provide first contact information to enable the first user to initiate a first voice connection to the server, contacting the second user over the non-voice communication service to provide second contact information to enable the second user to initiate a second voice connection to the server, monitoring for the first and second voice connections at the server and upon receiving the first and second voice connections, bridging the first and second voice connections to establish the voice communication service. The non-voice communication service may provide transmission of a SMS message, and the voice service request may be embedded in the SMS message. The first and second voice connections may be initiated by the first and second users in a voice-enabled network, and the voice enabled network may be selected from the group consisting of ISDN, PSTN, PBX, ATM, packet-based circuits and cellular network.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF EMBODIMENT

Figure 1:
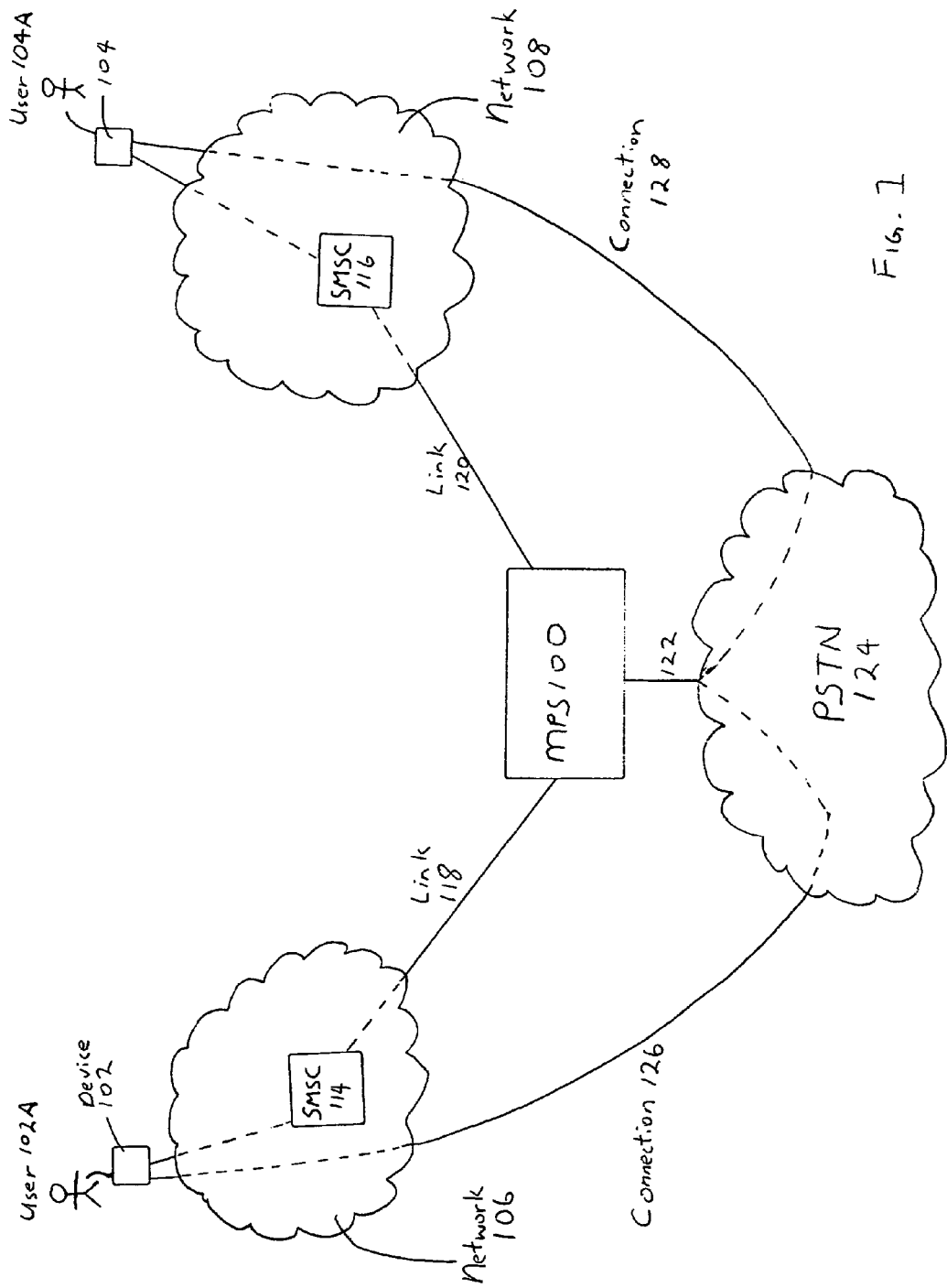
FIG. 1 is a block diagram representation of multi-protocol server operating in a cellular and switched telephone networks environment.

The description which follows, and embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

Referring to FIG. 1, an embodiment of the present invention is shown in which a multi-protocol server (MPS) 100 provides management of multiple communication services, such as voice and non-voice communication services operating over one or more communication protocols, between terminal devices such as devices 102 and 104. Preferably, MPS 100 enables a non-voice communications request issued over a non-voice service to establish a voice service between their respective users.

While the description that follows describes an embodiment relating to the establishment of a voice service connection initiated by a SMS message from a cellular network device, it will be appreciated that other embodiments may provide for the establishment of an alternate communication service by a request issued through a first communication service without the use of a cellular device or with the use of other communication protocols.

Typically, in addition to capabilities to directly call and receive calls, cellular communication networks provide short message service (SMS) to its subscribers. Such SMS permits a cellular subscriber 102A having a terminal device 102, such as a cellular phone with SMS messaging capabilities, to send and receive short messages, typically limited to 160 characters, to another SMS-enabled device, whether on the same cellular network or on another network. SMS operates in a manner similar to a simplified email for terminal devices on a cellular network, in that alpha-numeric text messages may be transmitted between such devices, with the mobile identification number (MIN) of each device being used for the destination address for forwarding messages to that device by a cellular network.

Unless specifically blocked by a user of terminal devices, SMS messages, like cellular phone calls, typically include information regarding the sending device, such as the MIN and destination address (typically a telephone number identifying another cellular device belonging to another subscriber) in order to allow messages to be exchanged between devices and to allow the receiving device to identify the sending device.

Once a SMS message is sent from a device connected to a cellular network, the SMS message is typically transmitted from the device to a SMS center (SMSC) of the cellular network, which provides a store and forward mechanism for SMS messages within the cellular network. The SMSC then forwards the SMS message onto the appropriate destination, such as, if the destination is another device on the same cellular network, then to that identified cellular device. Alternatively, if the destination device is on another cellular network, then the SMS center forwards the SMS message to another SMSC in the other cellular network for transmittal by that other SMS center to the destination device on that other cellular network. Generally, communication between SMSCs is through a direct connection between the SMSCs on separate cellular networks. Alternatively, this communication may be through a third party communication hub connected to each cellular network to enable communications between the networks through the hub.

Alternative network implementations may include a grooming server for filtering SMS messages before such messages are transmitted to a SMSC. Based on optionally-enabled filtering criteria, such as the destination of a SMS message, the grooming server may pass the message on to a SMSC, or re-route the SMS message itself to the destination device and thus by-pass the store and forward function provided by a SMSC entirely.

A SMS message typically consists of two parts: the header information and the text message itself (i.e., the user entered text message). The header includes the following information: SMSC address; destination address; and originating address. Each of these parameters typically has MIN information identifying the SMSC, the SMS recipient terminal device, and the SMS message sending terminal device, respectively. The SMSC address is used to forward the SMS message from the sending terminal device to the identified SMSC in the cellular network. The destination address is used by the SMSC to forward a received message onto the recipient of the SMS message. The originating address is, unless otherwise blocked, provided with the SMS message so that the recipient of the message can identify the sending terminal device.

In the context of SMS messages, a "chat-session" may be set up between two or more users in a similar manner to those that are popular on the internet and implemented via, for example, e-mail or HTTP (HyperText Transfer Protocol) protocols. In the SMS context, this may be accomplished by incorporating a message controller in between two users who wish to engage in a chat-session. By having a message processor in between users, some level of control in the communications between such users may be achieved, such as, for example, keeping such users anonymous and other contact information regarding each users from being made known to other users in that session.

In the SMS context, a chat session may be configured up for users 102A and 104A, each having terminal devices 102 and 104 respectively, through MPS 100 which provides, among other things, the message controller functions for the chat-session. In this example, devices 102 and 104 are each operating in different cellular networks 106 and 108, with each network 106 and 108 each including a SMSC 114 and 116, respectively. Devices 102 and 104 are multi-protocol enabled devices, which include two-way SMS and voice communication capabilities. In this environment, user 102A accesses the chat-session by generating and sending SMS messages to MPS 100 through cellular network 106. SMSC 114 first receives the SMS messages, and then analyzes the destination address of the message to determine that is for MPS 100, and then forwards the messages to MPS 100 via communication link 118. Similarly, user 104A participates in the chat session by sending messages through cellular network 108 and SMSC 116, which connects to MPS 100 via communication link 120. As discussed in greater detail below, it will be appreciated that the operation of a chat session for devices operating on a single cellular network would be similar, except that a single SMSC in the network would handle the message forwarding to and from terminal devices to a MPS. It will also be appreciated that in alternate embodiments MPS 100 may communicate with SMSCs via a wireless modem (not shown), or communicate directly with devices 102 and 104 via a SS7 (Signalling System 7) connection, as is known in the art.

To facilitate communications between users 102A and 104A in a chat session, each user may be provided with alias userids that are provided and managed by MPS 100. For instance, user 102A may have the userid "Chris" while user 104A may have the userid "Suzee". Each userid managed by MPS 100 may then be stored along with other information relating to the user, such as contact information including the MIN of a terminal device. For this example, the MIN of device 102 would be linked to the userid "Chris", and the MIN of device 104 would be linked to the userid "Suzee".

For a SMS chat session to occur between users 102A and 104A, SMS messages are sent to MPS 100 with information identifying the userid of the sender and the recipient of the message. For example, if a message is to be sent from user 102A ("Chris") to user 104A ("Suzee"), user 102A may include the userid "Suzee" into the text of the SMS message, which is routed to MPS 100 through SMSC 114 and network 106. After receiving the message, MPS 100 analyzes the message to determine that the message is meant for delivery to the user identified as "Suzee". As such, MPS 100 forwards the SMS message to the user "Suzee", first by MPS 100 checking for and retrieving the MIN associated with the userid "Suzee", and then generating an updated SMS message with the MIN of "Suzee" in the destination address parameter of the updated SMS message, and the MIN of the MPS 100 as the reply address. The updated message also has its SMSC address parameter updated to reflect the SMSC associated with the MIN of "Suzee". In this example, the SMSC address will be updated to reflect to MIN of SMSC 116. After the SMS message is updated, the message is forwarded to SMSC 116 for transmission to device 104 based on the MIN associated with the userid "Suzee". The userid "Chris" may be included in the SMS message by MPS 100 as well, so that user 104A is aware of who the message sender is. If user 104A sends a reply to "Chris" via MPS 100, MPS 100 would likewise be able to pass the message to device 102, since the MIN of device 102 is associated with the userid "Chris" at MPS 100. In this way, MPS 100 provides complete control of communications between users. While allowing communications to occur between users, MPS 100 allows for the option to (i) mask the actual identity and contact information of a user from other users, (ii) provide some, but not all, of such information to users, and (iii) allow complete transparency between users, depending on the amount of information MPS 100 is configured to transmit between users.

MPS 100 includes application modules to analyze SMS message to identify requests of users 102A or 104A sent from devices 102 and 104. In the embodiment, the modules include the ability to recognize a request for establishing a call or voice service, such as identified by the SMS text "TALK userid". For example, if user 102A issued the request "TALK Suzee" in an SMS message from device 102, then MPS 100, upon receipt of the message, would interpret the message to be a request requiring further processing rather than as a message to be passed to the user associated with the userid "Suzee".

Once MPS 100 receives a voice service request from user 102A, it then preferably immediately attempts to establish a voice service connection between users 102A and 104A. Alternatively, it may first seek approval from user 104A to establish the voice service connection. If MPS 100 first seeks approval from user 104A, then an SMS message is sent from MPS 100, as described above, to device 104 asking if user 104A accepts voice communications with the user "Chris". If user 104A accepts the voice service request via a reply SMS message to MPS 100, then MPS 100 selectively initiates voice communications between users 102A and 104A (as described in further detail below). If user 104A refuses or ignores the request for voice service, then MPS 100 sends a reply SMS message to device 102 to notify user 102A that the voice service request was denied. In an alternative embodiment, upon accepting a request for voice service, a user is permitted to specify a different telephone number than the one currently registered with its userid on MPS 100 for setting up a voice service connection.

If user 104A accepts the voice service request from "Chris" (i.e., user 102A), then MPS 100 connects to a public switched telephone network (PSTN) 124 to establish voice calls 126 and 128 with each of devices 102 and 104, based on the MINs associated with the userids "Chris" and "Suzee" respectively. In addition to a PSTN, it will be appreciated that MPS 100 may initiate voice communications over other types of networks, such as PBX, cellular networks or data networks permitting Voice-over-Internet-Protocol (VoIP) communications.

In the embodiment, a separate call is established by MPS 100 to each of devices 102 and 104, before linking up the two calls to complete a voice service connection between devices 102 and 104. However, it will be appreciated that other calling arrangements may be made between devices 102 and 104. In the embodiment, once a call has been established with each of devices 102 and 104, MPS 100 provides each user with a menu of options, such that each user may select from a number of options before and during the voice service connection with the other user. In one option, MPS 100 first prompts each of users 102A and 104A, among other optional things, to confirm that they wish to connect with the other user before actually linking the two devices 102 and 104 via a voice connection. In this option, MPS 100 would proactively prompt users 102A and 104A, who must then enter responses to the menu selections via the keypad or via voice on device 102 and 104 to continue the process of establishing a voice service connection, as explained in greater detail below. In another option, MPS 100 may be passive. In this latter option, MPS 100 waits and listens for commands that may be issued by either user 102A or 104A via the keypad or via voice, rather than actively presenting options for each user to select in order to proceed. In this option, MPS 100 does not prompt each user for any responses, and instead merely listens for any commands while MPS 100 is establishing its separate calls to devices 102 and 104, and then bridges the two calls to establish the voice service connection after both calls are successfully established.

In this manner, MPS 100 maintains control of a voice "chat-session" and may, at its option, forward or mask contact information regarding one user from another in its call set up with the communication device of a user. The masking of information may done, for example, by only providing the caller line identification (CLID) information of MPS 100 to each user it calls, instead of the CLID of the other user to be connected by voice.

In another embodiment, rather than calling users 102A and 104A, MPS 100 sends a SMS message to each of devices 102 and 104 with call-in information for users 102A and 104A make a voice call to MPS 100. The call-in information may include an access code that each of users 102A and 104A must input after calling in to identify its associated voice service request or identify the userid of the person making the call, such that MPS 100 may match the caller to a voice service request. Instead of using access codes, MPS 100 may alternatively examine the MIN information of a call made to it and match to the call to a voice service request with this information. MPS 100 maintains a record of information regarding each user registered with it, and so it may match the MIN information of a caller to a particular userid, and from the userid, identify an associated voice service request. In this latter option, MPS 100 would prompt a caller to enter access code information only if it is unable to identify the appropriate voice service request with its received MIN information. In either option, once MPS 100 recognizes users 102A and 104A as the callers, it may provide the users with a menu of options, as discussed above, and bridge the two calls in the same manner as explained above in the situation where MPS 100 calls users 102A and 104A.

Figure 2A:
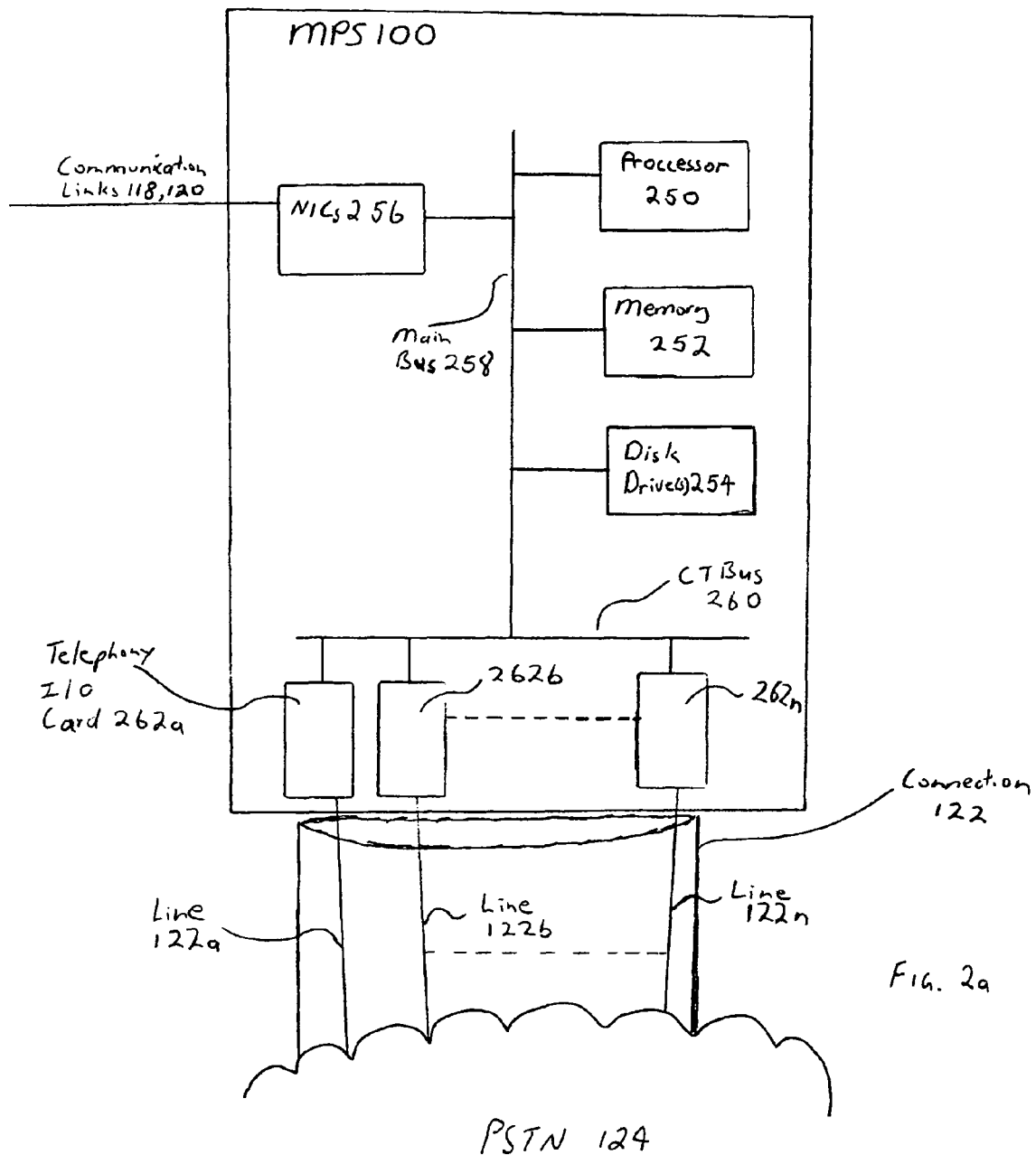
FIG. 2*a* is a block diagram showing hardware details of the multi-protocol server of FIG. 1.

Referring to FIG. 2a, additional detail regarding MPS 100 is provided. MPS 100 may be implemented on a single computer workstation (as shown) or on any number of distributed computing stations, nodes or platforms as is known in the art. For the embodiment, MPS 100 contains elements for accessing voice and data communication networks, such as network interface cards (NIC) 256 for accepting and sending SMS message traffic through communication links 118 and 120, and telephony I/O cards 262 for connecting to PSTN 124 to establish, maintain, and tear down telephone calls. The hardware combinations that may be utilized to implement MPS 100 are well known in the art for microprocessor-based systems, and further include a microprocessor 250, computer readable memory 252, disk drive(s) 254, and backbone buses, including main bus 258 and a CT (Computer Telephony) bus 260 for connection to each telephony I/O cards 262 in MPS 100. MPS 100 typically includes multiple telephony I/O cards 262a to 262n so that it can make a number of call simultaneously over different phone lines 122a to 122n through PSTN 124. Lines 122a to 122n are collectively referred to as connection 122 in the Figures. Examples of telephony I/O cards suitable for use in connecting MPS 100 to PSTN 124 include the DMV960A-4TI made by Intel™, and other cards that are compliant for connection with Enterprise Computer Telephony Forum (ECTF) standard H.100 or H.110 CT buses.

Figure 2B:
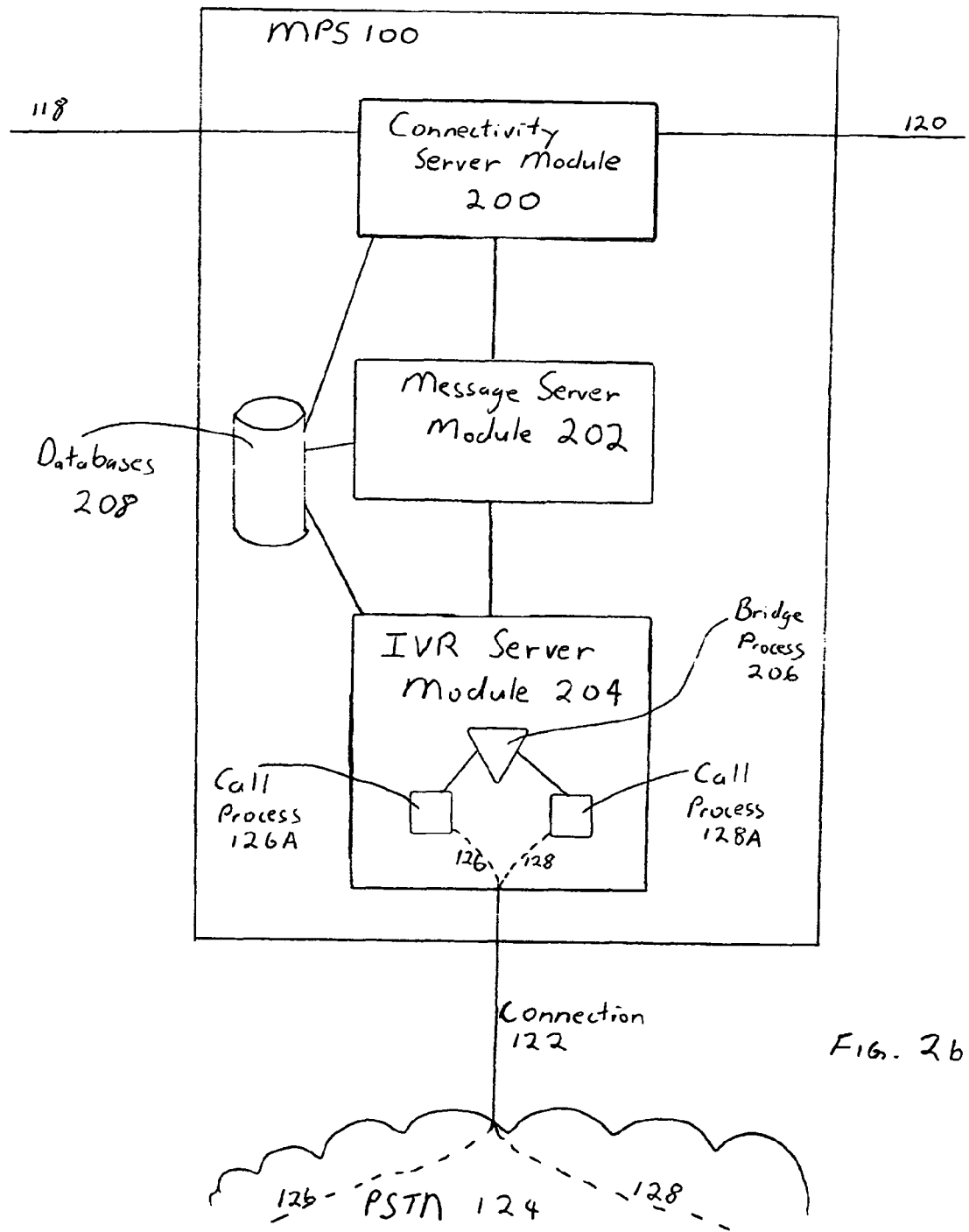
FIG. 2*b* is a block diagram showing software details of the multi-protocol server of FIG. 1.

Referring to FIG. 2b, MPS 100 further includes software data structures and databases 208 that may be accessed by modules of MPS 100 during its control of a voice chat session and in its establishment, maintenance, and tear-down of a connection associated with a voice service.

MPS 100 includes a connectivity server module 200 for handling external communications with SMS centers, a message server module 202 for processing of SMS messages sent by users of a chat-session, and one or more IVR server modules 204 for establishing and maintaining any established voice service connections.

Connectivity server module 200 is a software application that handles SMS message connectivity between MPS 100 and the SMSCs, such as SMSCs 114 and 116 (shown in FIG. 1), of cellular networks. Communication between SMSC 114 and MPS 100 is provided through communication link 118, which is a TCP/IP connection over a typical data network. Optionally, communication link 118 may be a SS7 connection from MPS 100 to SMSC 114. As a further option, a wireless modem (not shown) may be provided with connectivity server module 200 so that communication link 118 may optionally be a wireless connection. Similarly, communication link 120 provides communication between SMSC 116 and MPS 100 in much the same manner as just described for communication link 118.

Through communication links 118 and 120, connectivity server module 200 accepts SMS message traffic from SMS centers 114 and 116 for which the SMS message address or destination identifies MPS 100 (and hence, identifies the message as SMS chat traffic), and passes such SMS messages to message server module 202 for processing. Connectivity server module 200 also accepts requests to transmit SMS messages from message server module 202, and based on the address or destination information, such as the MIN of a cellular device of devices 102 or 104, transmits such SMS messages to the appropriate SMSC, such as SMS centers 114 and 116, for redirection to the destination device.

Message server module 202 is a software application that provides the main functionality for operating chat sessions between users. Message server module 202 interprets SMS messages sent from a user registered with the chat-session to determine the command or request that is desired by the user and initiates an appropriate action in response to the user's request. Message server module 202 further provides data storage and retrieval for information regarding each user participating in a chat session, such as contact information for the user, including a MIN. Such information is stored in one or more of the databases 208 of MPS 100. Each user registered for chat sessions has its information stored within such databases 208, which are accessible by message server module 202. Databases 208 may be stored locally to message server module 202, as shown in FIG. 2, or optionally they may be remote to message server module 202 in any local, remote, or distributed database environment, as is known in the art. Further, message server module 202 may provide tracking of user statistics and usage history in one or more databases 208 accessible by the module. Still further, message server 202 handles error conditions returned from IVR server module 204, as discussed below, and in response optionally generate appropriate error messages for transmission to one or more terminal devices, as appropriate.

In operation, message server module 202 recognizes a user's action or request based on an analysis of a SMS message that was received through connectivity server module 200. For example, the SMS message received may contain the userid of another user registered with MPS 100 in a chat-session. In such a case, message server module 202 recognizes that this is a message to be forwarded, and looks up the MIN information associated with the recipient userid. Message server module 202 then generates a updated SMS message, as described above, with the MIN of the recipient as the destination address parameter, the MIN of the SMSC associated with the destination address as the SMSC address parameter, and the MIN of MPS 100 as the originating address parameter of the updated SMS message's header. The updated SMS message may have the userid of the sender added to the text as well. The updated SMS message is then passed to connectivity server module 200 for transmittal of the SMS message towards the intended recipient.

Message server module 202 can also recognize a voice service request, such as via a "TALK" command embedded in the text of a SMS message. Once a voice service request is recognized in an SMS message, message server module 202 contacts IVR server module 204 to initiate establishment of a voice service connection, and optionally generates a SMS message for transmission to the other user with whom a voice channel is requested to check if the other user would accept a voice service connection.

To recognize that a SMS message is a voice service request, the user-entered text portion of the SMS message is parsed by message server module 202. Specific words appearing in combination with userids, such as "TALK Suzee", is recognized by message server module 202 as a voice service request. It will be appreciated that other text recognition criterion may be used to identify text in a SMS message as a command, including the use of specified alpha-numeric codes or command words. Once a voice service request is recognized, message server module 202 validates that the userid specified in the request matches a user registered with MPS 100 with voice contact information, so that MPS 100 has the required information to initiate a voice service connection to the requested user. Optionally, message server module 202 may check that a received voice service request was issued from a valid user. This may be accomplished, for example, by checking the SMS message header for the originating address of the SMS message and checking that this address corresponds to the MIN of a registered user. Further, other validation tests may optionally be performed against both users associated with a voice service request. Such tests may include a check that both users have accounts that are enabled for voice connections, or a check that the known information regarding each user has a certain level of compatibility based on pre-set criterion.

If an enabled validation criteria is not met, then the voice channel request is preferably rejected, and message server 202 may optionally generate an error SMS message for transmission by connectivity server module 202 back to the terminal device that requested the voice channel. If all enabled validation criterion are met, then message server module 202 generates a call setup command to IVR server module 204 to initiate establishment of a voice service connection. In generating this command, message server module 202 retrieves from databases 208 the relevant information regarding each user to participate in the voice service connection, such as the voice contact information of each user, and includes this information in the call setup command.

IVR server module 204 is a software application that, among other things, implements call setup commands from message server module 202 to establish a voice service connection between users identified by the voice service request. Using the voice contact information provided with the call setup command, IVR server module 204 attempts to establish a voice service connection between the users by making a separate voice call to each user. In operation, IVR server module 204 access telephony I/O cards 262 of MPS 100 for connecting to PSTN 124 via connection 122. For the embodiment, IVR server module 204 utilizes one telephony I/O card 262 for each voice call it makes through PSTN 124 to a user telephony device, such as devices 102 and 104. Each telephony I/O card 262 utilized by IVR server module 204, such as card 262a, reserves an independent line of PSTN 124, such as line 122a, for its call. As such, connection 122 represents one or more line connections into PSTN 124. It will be appreciated that in other embodiments a voice call may be established by IVR server module 204 to telephony devices via any one, or any combination, of voice-enabled circuits connected to the digital bridge or switch such as analog circuits, VoIP, T1 lines, ISDN, ISDN PRI, DSL, and SS7. It will further be appreciated that in such other embodiments, such a one using ISDN, a voice-network connection functionally equivalent to connection 122 may be a single data line that is connected to and shared between one or more telephony I/O cards 262.

IVR server module 204 provides a system for having automated responses generated in response to commands issued by users connected to IVR server module 204 by a voice call, such as, for example, users 102A and 104A connected via calls 126 and 128. For the embodiment, this functionality of IVR server module 204 is provided by voice or tone recognition software as is known in the art. This software accepts and compares the voice or keypad tone commands sent from terminal devices, such as devices 102 and 104, against anticipated voice or tone commands that are associated with command options provided by IVR server module 204. Once a match is found with an anticipated response, there is recognition of the command issued by the user, and IVR server module 204 then performs activities to implement the recognized command. In an alternate embodiment, the voice or tone command may be processed by a specialized DSP (Digital Signal Processor) accessible to IVR server module 204 for matching the voice or tone responses to anticipated commands, so that IVR server module 204 may thereafter take the appropriate action in accordance with the user's selection. It will be appreciated that this voice or tone recognition feature may be implemented by other combinations of hardware, software and firmware in other embodiments.

As discussed, IVR server module 204 establishes a separate call to each device of users desiring to be connected, such as devices 102 and 104, by reserving and making separate voice calls through separate lines of PSTN 124. For instance, in the above-described example, IVR server module 204 initiates call processes 126A and 128A for making voice calls 126 and 128 to devices 102 and 104 respectively. Each call process 126A or 128A establishes calls 126 or 128 respectively as follows: (i) a telephony I/O card 262 is reserved for making the connection; (ii) the voice contact information, such as the MIN associated with a user, is provided to the reserved telephony I/O card for the card to make the voice call; (iii) await for the call to be connected, that is, for the call to be answered; (iv) optionally provide an interactive menu of options that a user may select from via keypad tones or voice commands, as described above. In step (iii) an error condition is generated if the call process detects that there is no answer, there is a busy signal, that the called telephony device is offline, or that the call was sent to voice-mail. If an error condition is generated, and the error is passed back to message server module 202 for further processing. If a call is answered in step (iii), then the associated call process places the call on hold. While on hold, the call process may provide no further audio signal to the called user, provide information messages such as "Please wait while your call is connected", or present a menu of options to the user in described in step (iv). The available options that is presented in the menu of options, which include prompting the user to confirm its wish to have a voice channel established with another user, prompting the user to enter validation information, or other prompts and warnings as may be optionally set on MPS 100, such as warning to a user that it is about to exhaust its credits. If a user's responses to the optional menu leads to the call being terminated, such as a user denying that it wishes to have a voice service connection or failing to enter the correct authentication information, then an error condition is also generated, and the error is again passed back to message server 202 for further processing, such as the generation of error SMS messages for transmission to users 102A and 104A.

Once both calls 126 and 128 have been successfully established, and call processes 126A and 128A have optionally confirmed that each connected user would like a voice service connection with each other, bridge process 206 of IVR server module 204 is executed to link up call processes 126A and 128A via a connection through CT bus 260 (FIG. 2a), and to thereby provide a connection between calls 126 and 128 to thus establish a voice service connection between users 102A and 104A. After calls 126 and 128 are bridged, call processes 126A and 128A takes their respective calls off hold to complete establishment of the voice service connection.

As described above, in the embodiment IVR server module 204 establishes the calls between users anonymously, by not providing any CLID information or by providing the CLID of MPS 100 or some other entity associated with a chat session. Optionally, IVR server module 204 may establish a call to a user with the CLID information of the other user for which a voice service connection is set up, so as to give each user the MIN information of the other user. Bridge process 206 may also intercede into the call and separate the connection, allowing further individual processing of each called user (102A and 104A) by its associated call process (126A or 128A).

After a voice service connection is established between users, IVR server module 204 may process voice or other keypad tone IVR commands issued by a connected user, and performs the requests or actions requested, including a request to terminate a call. IVR Server module 204 may is also operable with message server 202 during a call, so that appropriate SMS messages may be forwarded to each user. For example, a message may be sent to notify a user that its call is about to expire or credits are exhausted. IVR server module 204 may also provide other optional functionality, such as providing voice prompts, audible prompts or other warnings to users to alert them that their call is about to end; or to query if they would like to purchase or use additional credits to extend a call. The credit system may be optionally activated or deactivated.

In an alternate embodiment, multiple IVR server modules 204 are distributed among different hardware nodes. In one embodiment, IVR server modules are located in different geographic regions for establishing voice connections to users in that geographic region, so as to reduce the need for establishing long distance connections. For example, if devices 102 and 104 have MINs registered in different telephone area codes, then message server module 202 may contact separate IVR server modules, each located in the same area codes as device 102 and 104, respectively, to establish a voice service connection between these devices. In such an environment of distributed IVR server modules operating on separate hardware nodes, communication links are provided between such hardware nodes to enable a voice service connection to be set up between devices connected to separate IVR server modules in different geographic regions. It will be appreciated that such communication links may be provided by a number of data communication protocols and networks as is known in the art, such as TCP/IP over an ATM network.

With reference to FIGS. 1 and 2, an exemplary establishment of a voice service initiated by a SMS message request is provided. Therein, user 102A has registered with a chat service provided by multi-protocol server 100 with the userid "Chris", and user 104A has registered with the userid "Suzee". Further, each user 102A and 104A has registered device 102 and 104 respectively, along with their respective MIN numbers, with their userids. During a chat session, in which SMS messages are exchanged between users 102A and 104A via MPS 100, either one of users 102A or 104A may initiate a request for voice service. If, for example, user 102A initiates a request for voice service with the user identified by the userid "Suzee", this request is initiated by sending an SMS message from device 102 with the message "TALK Suzee" in the text portion of the message. This SMS message is then sent to SMSC 114 in cellular network 106, and since the SMS message is generated in the context of a chat session, the SMS address and destination information in the SMS message will identify MPS 100, and hence SMSC 114 will forward the SMS message to MPS 100 through communication link 118.

At MPS 100, connectivity module 200 receives the SMS message through communication link 118, and passes the SMS message to message server module 202. Message server module 202 then interprets the SMS message and recognizes the "TALK" command for requesting a voice service request. Message server module 202 further recognizes that the request is for a voice service request with the user associated with the userid "Suzee", and provides selective initiation of a request for a voice service request. As such, message server module 202 will then search databases accessible to it for information relating to the userid "Suzee", and identify a MIN associated with that userid. Message server module 202 then generates a prompt message which would indicate to "Suzee" (i.e., user 104A) that the user "Chris" is requesting a voice service connection. This message is provided to connectivity server module 200 along with the MIN associated to "Suzee", and connectivity server module 200 then forwards the SMS message based on the MIN to device 104 on cellular network 108 through communications link 120 and SMSC 116.

Upon receiving the prompt message, user 104A has the option to accept, refuse or ignore the request for a voice service connection with "Chris". Should user 104A refuse or ignore the request, that refusal is passed as a message back to MPS 100. Thereafter message server module 202 may then generate a response message for transmission to "Chris" to indicate that its request for voice service has been denied.

If, on the other hand, user 104A accepts the request for a voice connection, then message server module 202 sends a call setup command to IVR server module 204 for establishing a voice channel between users 102A and 104A. The command from message server module 202 to IVR server module 204 includes contact information, including telephone numbers registered with each userids "Chris" and "Suzee", for establishing the voice service connection. IVR server module 204 then initiates call processes 126A and 128A as described above to connect to PSTN 124 via connection 122 in order to establish a call with each telephone number associated with the userids "Chris" and "Suzee". In this example, such telephone numbers are the MIN for each of devices 102 and 104, respectively.

As described above, in the embodiment each call process 126A or 128A reserves a separate line of connection 122 to establish separate telephone calls to each of device 102 and 104, shown as 126 and 128, respectively. Call process 126A initiates the call by issuing a hardware call to a telephony I/O card 262 to reserve it for call process 126A, and to dial the MIN associated with "Chris". Thereafter, call process 126A awaits for the call to be "answered" on device 102. If the call is not answered, then an error condition is generated by call process 126A. The error condition is passed back to IVR server module 204, which may optionally initiate another call process 126A to attempt to establish call 126 again, or IVR server module 204 may declare that the call was unsuccessful and pass this information to message server 202, as described above. At this point, message server 202 may optionally generate a SMS error message which is passed to connectivity server 200 for transmission to devices 102 and 104, to alert users 102A and 104A that a call to "Chris" cannot be completed. Processing of the voice service request then ends.

If, on the other hand, the call is answered on device 102, then call process 126A continues by placing "Chris" on hold. While on hold, "Chris" may optionally be provided with a menu of IVR options, as discussed above. Should a selection or response to a prompt lead to the termination of the call, then again an error condition is generated and returned to message server module 202, as described above.

Coincidentally with the establishment of call 126, call process 128A attempts to establish call 128 for "Suzee", in the same manner as described above in respect of call process 126A. If successful, call 128 is also placed on hold after it is connected. If not, then an error condition is generated by call process 128A, and the error condition is handled similarly to an error condition from call process 126A, as described above.

Should both calls 126 and 128 be successfully established and not optionally disconnected while they are on hold, IVR server module 204 then launches bridge process 206 to connect the two calls 126 and 128. Once the calls are connected, call processes 126A and 128A takes their respective calls off hold, and thus completes establishment of voice service between "Chris" and "Suzee".

After voice service is established, IVR server module 204, though call processes 126A and 128A, may optionally continue to provide users 102A and 104A with additional menu selections and options, such as options to extend the duration of the voice connection over the channel via use of extra credits, or to terminate the call. As discussed above, these options may be presented passively, so that users 102A and 104A are not prompted during the voice connection, or they may be active, such as voice or other audible prompts or warnings provided to either or both users 102A and 104A. In certain situations, such as when credits are exhausted, IVR server module 204 may command that call processes 126A and 128A put calls 126 and 128 on hold while awaiting resolution of the situation. In a situation of credit exhaustion, either or both of users 102A and 104A may be provided with options to purchase or use additional credits. Once the situation is resolved, calls 126 and 128 are taken off hold, and the voice connection between "Chris" and "Suzee" may continue.

An established voice service connection between users 102A and 104A may be controlled or terminated by IVR server module 204 or by either user 102A or 104A. IVR server module 204 may terminate the voice service connection over the channel if there is an unresolved situation that does not permit voice service to continue, such as the exhaustion of credits of one or both of users 102A and 104A. User 102A or 104A may terminate the voice service connection by hanging up, or by issuing a voice or tone IVR command to terminate the established voice service. For the embodiment, if the bridged connection is terminated by IVR server module 204 or by an IVR command, bridge process 206 is terminated, but preferably each of call processes 126A and 128A continues to be active for calls 126 and 128 respectively. Users 102A and 104A may then choose to continue to interact with IVR server module 204 through processes 126A and 128A, or choose to terminate its call 126 or 128 with a further IVR command or by hanging up. For each user 102A and 104A, options for continued interaction with IVR server module 204 may include re-establishing voice service with the other user, establishing voice service to another user, or terminating its call 126 or 128. Should call process 126A receive a command to end its associated call 126, or if user 102A hangs up, then call process 126A recognizes a complete call termination request and ends call 126, releases the telephony I/O card it has reserved for call 126, and then terminates processing and returns control to IVR server module 204. The same occurs with respect to call process 128A should it receive a command to end call 128 or if user 104A hangs up.

Upon termination of call processes 126A and 128A, IVR server module 204 may optionally store any call statistics it has collected to databases 208.

If a user, for example, "Chris", terminates an established voice channel between users 102A and 104A by hanging up device 102, then call 126 is terminated immediately and call process 126A would recognize this and terminate also after releasing its reserved telephony I/O card 262. Bridging process 206 would likewise recognize that one of its bridged call processes is no longer active, and thus would also terminate. At this point, IVR server module 204 may optionally attempt to re-establish voice service, by having call process 128A putting call 128 on hold, and invoking call process 126A to attempt to establish call 126 again. If successful, then bridging process 206 may be invoked again to bridge the two calls, as described above. If unsuccessful, or if IVR server module 204 optionally decides to not attempt to establish connection 126 again, then call process 128A may optionally continue to provide IVR options to user 104A, as described above. Should user 104A choose to terminate the call, or if user 104A also hangs up, then call process 128A and call 128 are also terminated, as describe above, and IVR server module 204 is then finished with processing the established voice channel.

Regardless of how an established voice service is terminated, once IVR server module 204 terminates processing of the voice service, it may optionally alert message server 202 to this fact, so that messages server 202 may optionally store the statistics of the calls 126 and 128 into databases 208, and optionally generate SMS messages for transmission to each user 102A and 104A to alert them that the voice service between them was terminated. Further, it will be appreciated that regardless of how the voice service between users 102A and 104A is terminated, IVR server module 204 may optionally terminate all of call processes 126A and 128A, and bridge process 206 and thus immediately terminate all calls with users 102A and 104A without providing further IVR options or any further processing by MPS 100.

After voice service is established between users 102A and 104A, IVR server module 204 stays in communication with message server module 202, allowing for SMS messages to be sent to either or both of devices 102 and 104 with information that is related to the voice service, such as the amount of available time left on the voice connection based on available credits.

Optionally, upon receiving a voice service request, MPS 100 may automatically set up the requested voice channel without further intervention from the users or waiting for the recipient to accept the voice connection. For example, if user 102A initiates a voice service request with user 104A (or a userid associated with user 104A), upon receiving the request, the modules of MPS 100 proceeds to process the call as described above, except IVR server 204 would immediately launch processes 126A and 128A to establish calls 126 and 128 to devices 102 and 104, as described above, without providing any IVR selections to the users. As such, IVR server would make the calls 126 and 128 and, with or without waiting for each call to be "picked up", bridge the two calls 126 and 128 with bridge process 206 after call processes 126A and 128A have been initiated. Further, the maintenance and termination of a voice service connection may optionally be handled without further intervention by MPS 100, in that IVR server 204 may simply keep the connection active until one or both users terminates the voice channel, for example, by hanging up.

It will be appreciated that, while in the description above the voice service request was initiated by one of the users connected to MPS 100, a voice service request may also be generated by MPS 100 to establish a voice service connection between two users, such as users 102A and 104A. MPS 100 may generate the voice service request itself if certain criterion are met, such as if users 102A and 104A have exchanged a certain number of SMS messages over MPS 100. Once such a voice service request is generated, MPS 100 handles the request in the same manner as described above, except that both users 102A and 104A may both be now optionally contacted to determine if each user wishes to establish a voice service connection to the other user.

Figure 3:
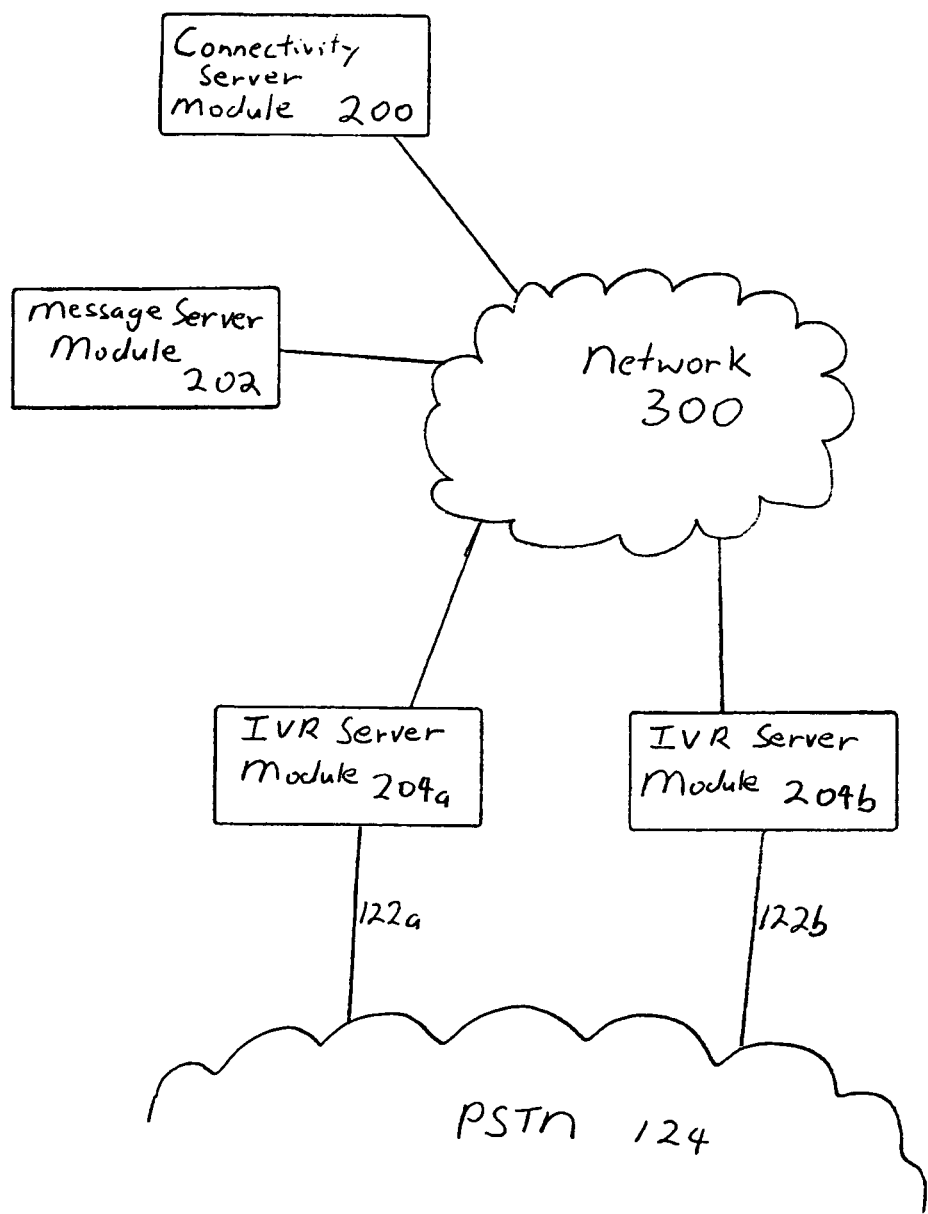
FIG. 3 is a block diagram representation of modules of the multi-protocol server of FIG. 2 distributed as separate elements in a distributed network environment.

While MPS 100 is described thus far as a "centralized" server embodying each of connectivity server module 200, message server module 202, and IVR server module 204, it will be appreciated that MPS 100 may optionally be distributed over different nodes, workstations or platforms and connected via a data network. As shown in FIG. 3, each of connectivity server module 200, message server module 202, and IVR server module 204 are provided on separate hardware nodes (not shown) and connected to each other via a data network 300. Each module may be connected in network 300 via any one, or any combination, of backbone networks such as ATMs, PSTNs, ISDNs, packet-based circuits (including frame relay or IP), or point-to-point circuits, and communications may be handled by any one, or a combination, of communication protocols such as XML, SOAP, TCP/IP or other networking protocols.

A distributed implementation of MPS 100 may be preferred in situations where there are multiple IVR server modules 204 that are implemented on different hardware nodes. For instance, IVR server module 204a and 204b may be implemented on separate hardware nodes in different geographic regions, but connected to each other and to other modules of MPS 100 by data network 300. The different hardware nodes may be connected, for example, by the TCP/IP protocol over communications links of a typical data network, such as an ATM network. In FIG. 3, each separate IVR server module 204a and 204b may access PSTN 124 separately via communication links 122a and 122b respectively, such that if a voice connection is to be made to a telephone number within the same or proximate geographic region as each IVR server module 204a and 204b, long distance telephone charges may be eliminated or reduced.

Additionally, in a distributed environment main control of MPS 100 may be distributed among different nodes housing modules of MPS 100, handled by any one of the nodes housing any one of the modules, or handled by a separate node (not shown) independent of any of the described modules, but connected to such modules via network 300, to control the operation of all modules.

Figure 4:
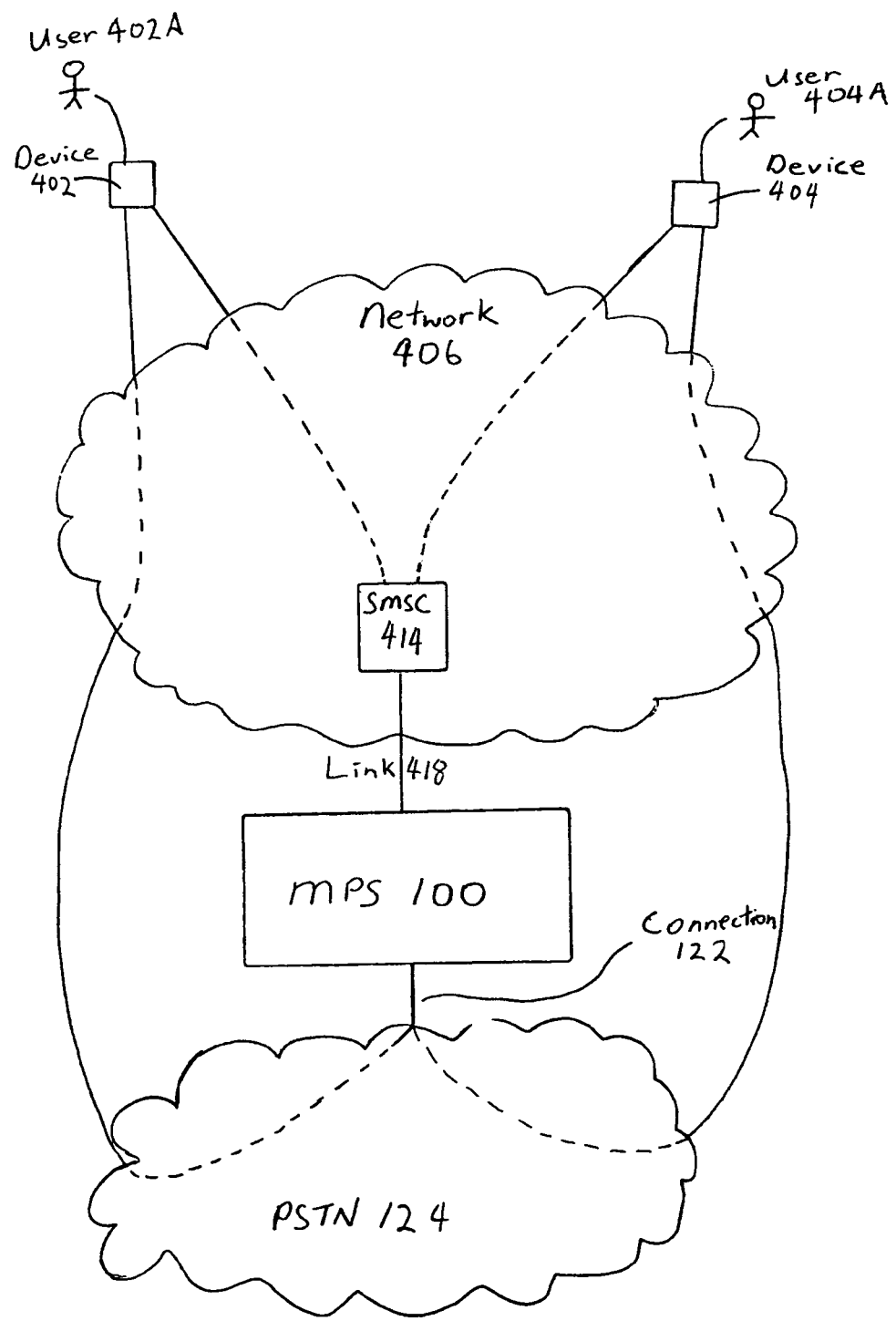
FIG. 4 is a block diagram representation of the multi-protocol server of FIG. 1, operating in an alternate cellular network environment.

Referring now to FIG. 4, a block diagram representing the connections of MPS 100 to user devices where users have devices on the same cellular network is shown. In FIG. 4, cellular devices 402 and 404 are similar to devices 102 and 104 described above, each having voice and SMS communication capabilities, and are both associated with the same cellular network 406. As such, the establishment of a chat session or a call between users 402A and 404A by MPS 100 is simplified from the process described above for users 102A and 104A, as now MPS 100 would only need to deal with a single SMSC 414 within cellular network 406, instead of multiple SMSCs from multiple cellular networks. In this environment, the operation of MPS 100 to establish a requested voice channel is similar to that described above, except now connectivity server module 200 would only have to manage communications with a single cellular network.

While the above embodiments have been described with respect to the establishment of a voice channel via a SMS message, it will be appreciated that other non-voice based communication protocols may be used to initiate and establish a voice channel. For example, WAP (wireless application protocol), MMS (multi-media messaging service), J2ME (Java downloadable clients), and BREW (binary run time for wireless environments) may all be used alone, in combination with, or in substitution of SMS messages to initiate the establishment of a voice channel. Further, in other embodiments, non-voice communications may be established through wired networks or packet-based wireless voice network, including networks compliant with 802.11b, 802.1 µg, GPRS, 1×RTT, EDGE, CDMA2000, or WCDMA standards. Further, it will be appreciated that initiation of a call may be originated from sources other than a chat session. It will further be appreciated that the embodiment is not limited to wireless communication links and devices only, and that in other embodiments a multi-protocol server may be adapted to accept voice connection requests from terminals that may or may not be connected to a data or voice network via wireless means. Still further, it will be appreciated that a MPS may establish a non-voice channel initiated from a voice channel, for example, by starting a SMS chat session from a voice connection. Still further, it will be appreciated that a MPS may be utilized to establish a second connection through a second protocol from a request that is received from a first connection on a first protocol.

Figure 5A:
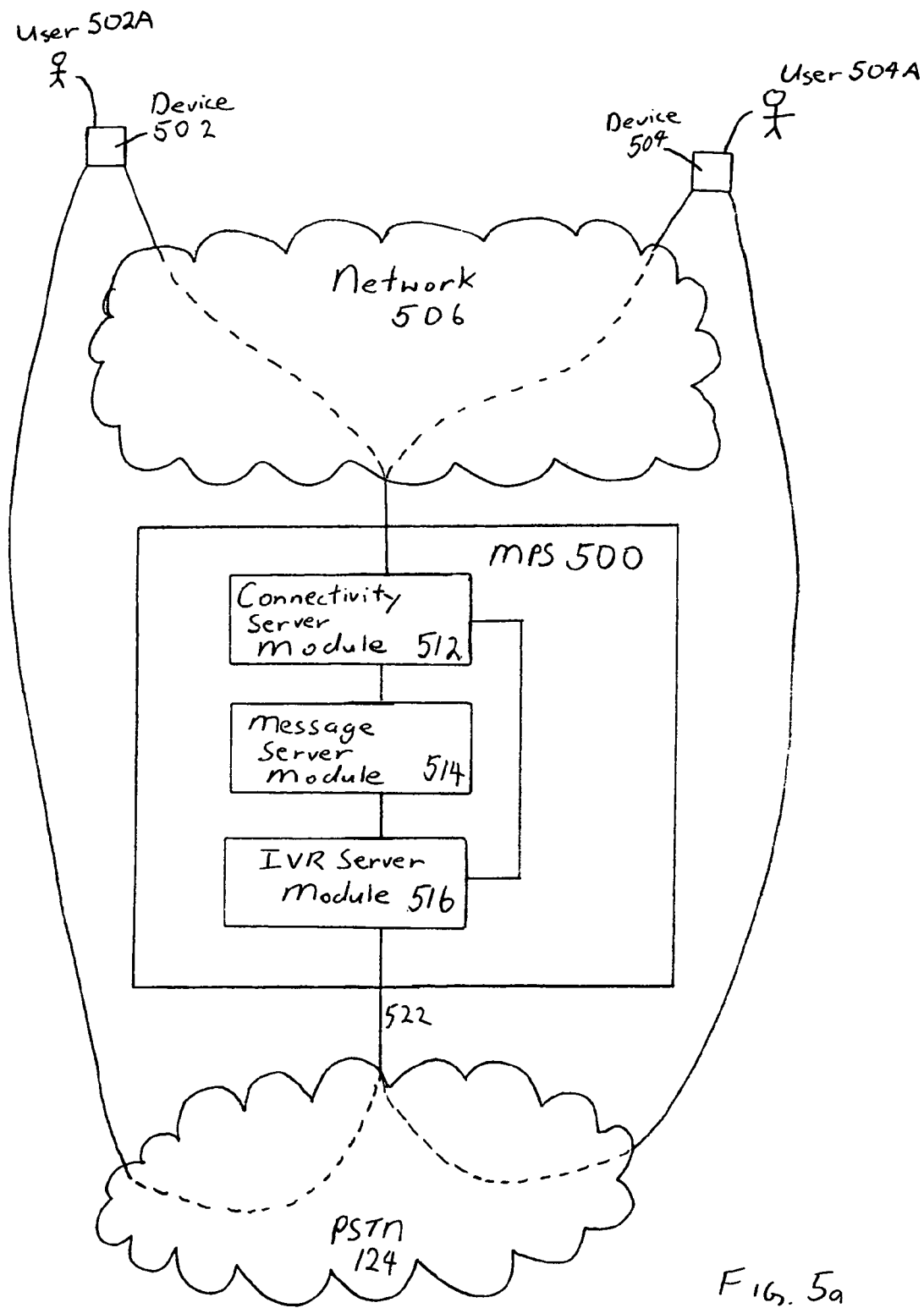
FIG. 5a is a block diagram representation of an alternate multi-protocol server operating in a data and a switched telephone network environment.

An alternative connection environment is shown in FIG. 5a. In FIG. 5a, a multi-protocol server 500 is shown whereby users 502A and 504A are connected in a chat session via a typical IP network 506 via applications such as ICQ, email or HTTP web browser chat sessions operating on terminal equipment 502 and 504. MPS 500 is connected to IP network 506 for communication with terminal equipment 502 and 504, each of which are under the control of users 530 and 532 respectively. MPS 500 operates in a similar manner to MPS 100 and includes: connectivity server module 512 for handling transmissions to and from IP network 506 relating to chat room messages from terminal equipment 502 and 504; message server module 514 for processing messages transmitted between terminal equipment 502 and 504 and for processing commands received from each terminal; and IVR server module 516 for initiating and maintaining voice channels requested by users such as 502A or 504A.

In this environment, terminal equipment 502 and 504 may be a computer terminal, wireless handheld computing device, a telephone, or any combination of the above that supports both voice and non-voice communications. Terminal equipment 502 and 504 may be one integrated terminal device incorporating capabilities to connect to PSTN 124 via voice connections and to IP network 506 via IP connections, or it may be separate communication devices under the control of users 503 or 532 respectively.

The operation of MPS 500 is similar to that of MPS 100 described above, in that if message server module 514 interprets a request from either user 530 or 532 to establish a voice channel with the other user, then message server 514 will contact IVR server module 516 with the telephone contact information of the other user, so that server module 514 will connect to PSTN 124 via link 522 to establish voice connections 526 and 528 to each of terminal equipments 502 and 504 respectively, in a manner similar to that described above for calls 126 and 128 in respect of MPS 100, in order to establish a voice channel.

Figure 5B:
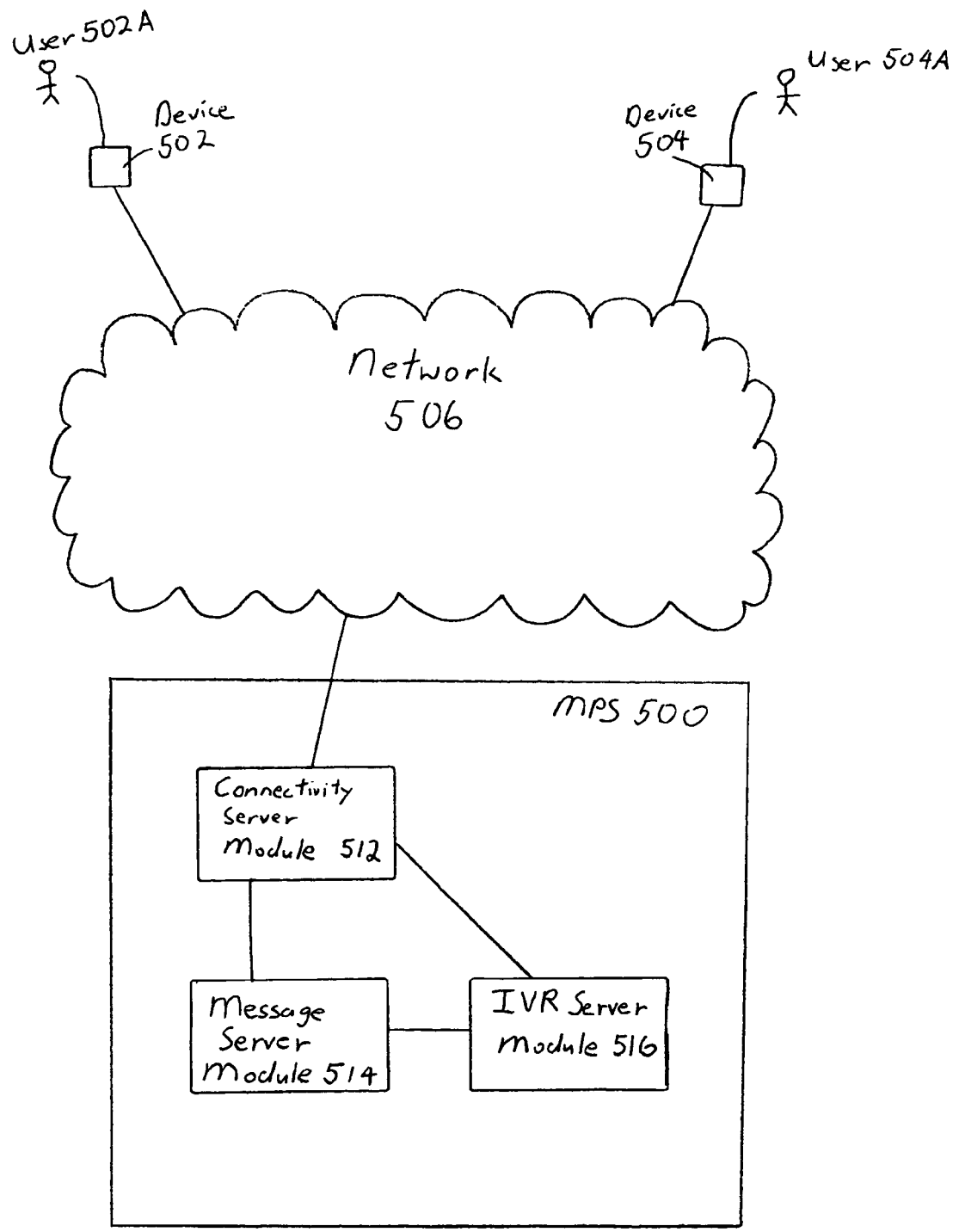
FIG. 5b is a block diagram representation of the multi-protocol server of FIG. 5a operating without a switched telephone network.

Referring to FIG. 5b, if IP network 506 and terminal equipment 502 and 504 are enabled with VoIP connectivity, then PSTN 124 may be bypassed altogether. In such an environment, the voice contact information of a user registered with the chat session, and stored in MPS 500, may not be a telephone number but instead be a network address, such as an IP address. In operation, IVR server module 516 would, upon receiving a request for message server module 514 to establish a voice channel, contact connectivity server module 512 to establish a voice connection to each of terminal equipment 502 and 504 via IP network 508 instead of through a telephone network, such as a PSTN or PBX. The establishment and handling of the voice connection between users 502A and 504A would be similar to that described above for the environment with a connection via a PSTN, only that in this environment, connectivity server module 512 would also provide a voice to IP translation function and the actual voice network connection is handled by connectivity server module 512 in an IP environment instead of by IVR server module 516.

It will be appreciated that in other embodiments, functions for connecting, maintaining, disconnecting calls, such as those defined above for processes 204, 206. 126A and 128A may be provided in different modules or may be organized in a different manner amongst the modules than as described above.

It will be appreciated from the above examples that a myriad of physical network connections and communication protocols may be used to implement embodiments of the invention. Although the invention has been described with reference to certain specific embodiments, various modifications thereof will be apparent to those skilled in the art without department from the spirit and scope of the invention as outlined in the claims appended hereto.

The embodiment of the invention in which an exclusive property or privilege is claimed are defined as follows:

1. A method for providing a voice communication service between a first user and a second user who are communicating via a non-voice communication service by exchanging non-voice communications by way of a server in communication with said first and second users, said method comprising:
receiving at said server, a first contact identifier of said first user from said first user;
receiving at said server, a second contact identifier of said second user from said second user;
receiving said non-voice communications in SMS messages from said first user and from said second user at said server;
forwarding at said server said non-voice communications from said first or second user to said second or first user, in accordance with destination information in said non-voice communications without sharing said first and second contact identifiers between said first and second users;
monitoring said non-voice communications at said server for a voice service request embedded in at least one of said SMS message; and
upon detection of said voice service request, selectively initiating establishment of said voice communication service between said first and second users through said server, by contacting said first and second users using said first and second contact identifiers, respectively and selectively providing said second and first contact identifiers to said first and second users, respectively.

2. The method according to claim 1, wherein said selectively initiating establishment of said voice communication service comprises:
identifying said first and second users by said server using data transmitted by said first and second users over said non-voice communication service; and
identifying said first and second contact identifiers for said first and second users for said voice service request utilizing said data.

3. The method according to claim 2, wherein said selectively initiating establishment of said voice communication service comprises:
initiating a first connection by said server to said first user using the contact identifier associated with said first user;
initiating a second connection by said server to said second user using the contact identifier associated with said second user; and
bridging said first and second connections to complete said initiating establishment of said voice communication service.

4. The method according to claim 3, wherein said selectively initiating establishment of said voice communication service comprises:
contacting at least one of said first and second users over said non-voice communication service for a confirmation of acceptance of said voice service request;
monitoring for said confirmation; and
upon receipt of said confirmation, initiating establishment of said voice communication service.

5. The method according to claim 4, wherein said confirmation from said at least one of said first and second users include alternate contact identifiers, said alternate contact identifiers being used by said server in initiating establishment of said voice communication service instead of said first and second contact identifiers.

6. The method according to claim 1, wherein said first and second connections are initiated by said server in a voice-enabled network.

7. The method according to claim 6, wherein said voice enabled network is selected from the group consisting of ISDN, PSTN, PBX, ATM, packet-based circuits and cellular network.

8. The method according to claim 7, wherein said selectively initiating establishment of said voice communication service further comprises:
checking for access rights of at least one of said first and second users.

9. The method of claim 8, wherein said selectively initiating establishment of said voice communication service further comprises:
checking for compatibility between said first and second users.

10. The method according to claim 9, wherein said non-voice communication service provides transmission of a SMS message, and said voice service request is embedded in said SMS message.

11. The method according to claim 10, wherein said first and second voice connections are initiated by said first and second users in a voice-enabled network.

12. The method according to claim 11, wherein said voice enabled network is selected from the group consisting of ISDN, PSTN, PBX, ATM, packet-based circuits and cellular network.

13. The method of claim 1, wherein said voice communication service and said non-voice communication service are provided to said first and second users at cellular handsets.

14. The method of claim 1, wherein said voice communication service is initiated only after receiving confirmation from said one of said first and second users that did not originate said voice service request.

15. A method of establishing a voice call between first and second users exchanging text messages by way of handheld communication devices, said method comprising:
receiving at a server, a first contact identifier of said first user from said first user;
receiving at said server, a second contact identifier of said second user from said second user;
selectively forwarding said text messages from said first or second user to said second or first user, in accordance with destination information in said text messages, to allow said first and second user to engage in a text chat;

monitoring at a message exchange server, said text messages from said first user and said second users for a voice service request; and upon detection of said voice service request from said first user, obtaining consent from said second user, and establishing a voice call between said first and second users at said handheld communication devices, by contacting from said server said first and second users using said first and second contact identifiers, respectively and selectively providing said second and first contact identifiers to said first and second users, respectively in accordance with configuration information at said server.

16. The method of claim 15, wherein said text messages comprise SMS messages, and said handheld communication devices comprise cellular handsets.

17. A message exchange server in communication with a cellular network, said message exchange server comprising a processor and memory storing processor executable instructions adapting said message exchange server to receiving at said message exchange server, a first contact identifier of a first user from said first user;

receiving at said message exchange server, a second contact identifier of a second user from said second user;

monitor text messages from first and second users;

selectively forward said text messages from said first or second user to said second or first user, in accordance with destination information in said text messages, to allow said first and second user to engage in a text chat;

monitor said text messages for a voice service request; and upon detection of said voice service request, selectively initiate a voice call between said first and second users, by contacting said first and second users using said first and second contact identifiers, respectively and providing said second and first contact identifiers to said first and second users, respectively.

18. The server of claim 17, wherein said text messages comprise SMS messages, and said text chat and voice call are provided at cellular handsets of said first and second users.

19. The server of claim 17, wherein said voice service request is originated by said first user and said message exchange server initiates said voice call after receiving confirmation from said second user.

* * * * *